United States Patent [19]

Naka

[11] Patent Number: 4,999,554
[45] Date of Patent: Mar. 12, 1991

[54] METHOD OF LOADING CONTROL PROGRAM FOR NUMERICAL CONTROL APPARATUS

[75] Inventor: Shigeaki Naka, Aichi, Japan

[73] Assignee: Mitsubishi Denki Kabushiki Kaisha, Tokyo, Japan

[21] Appl. No.: 440,164

[22] Filed: Nov. 21, 1989

[30] Foreign Application Priority Data

Nov. 22, 1988 [JP] Japan ................................ 63-295203

[51] Int. Cl.$^5$ ............................................ G05B 19/18
[52] U.S. Cl. .................................... 318/569; 318/571; 364/474.06
[58] Field of Search ................................ 318/569, 571; 364/474.06

[56] References Cited

U.S. PATENT DOCUMENTS 4,435,771  3/1984  Nozawa et al.
4,539,634  9/1985  Sakai et al. ...................... 318/569 X
4,684,861  8/1987  Kawamura et al. ................. 318/569
4,815,000  3/1989  Yoneda et al. ................... 364/474.06

OTHER PUBLICATIONS

*Angewandte Informatik*, 5/77, "Programmstruktur eines DNC-Systems", of J. Kreich.

"Die Organization von Datennetzen", of James Martin, published by Carl Hanser Verlag, Munchen, 1972.

*Primary Examiner*—William M. Shoop, Jr.
*Assistant Examiner*—Saul M. Bergmann
*Attorney, Agent, or Firm*—Sughrue, Mion, Zinn, Macpeak & Seas

[57] ABSTRACT

The present invention discloses a method of loading a control program for a numerical control apparatus, wherein the control program is composed of a plurality of load modules. Each module contains a judgment codes, such as a version number, at the head portion thereof, and is stored in a read/write operation enabling memory, so that each of the judgment codes can be compared with a corresponding judgment code received from an external apparatus by a judgment code comparing means. When the comparison detects different judgment codes, transmission of the new load module corresponding to the discorded judgment codes requested by a modified load module requesting means. Only the substantive portion of the load modules corresponding to the discorded judgment codes received through the comparing means and requesting means need be loaded onto the memory by way of a load means.

8 Claims, 6 Drawing Sheets

FIG. 5 PRIOR ART

METHOD OF LOADING CONTROL PROGRAM FOR NUMERICAL CONTROL APPARATUS

BACKGROUND OF THE INVENTION

1. Field of the Invention

This invention relates to a numerical control (hereinafter referred to as NC) apparatus, and more particularly to a method of loading a control program for an NC apparatus by which only a load module or modules of a control program which have undergone some change can be loaded into a memory device within the NC apparatus by way of a public network.

2. Description of the Prior Art

An NC apparatus makes a component of a machining center, a lathe, an electric discharge machine or the like and has a function of interpreting an NC program and outputting a command to a motor to move a working table in accordance with the contents of the NC program, another function of reading switch inputs of an operation panel and operating in response to such switch inputs, a further function of displaying a condition of the machine in the form of characters or figures on a CRT device and a still further function of executing control of a strong electric sequence, and so forth. Such functions are commonly realized by operation of a computer provided in the NC apparatus.

A computer incorporated in an NC apparatus normally includes a microprocessors as a central processing unit (hereinafter referred to as CPU) and also includes a read-only memory (hereinafter referred to as ROM) and a random access memory (hereinafter referred to as RAM) as main memory devices. The above listed functions of the NC apparatus are realized by execution by the CPU of a control program stored in the ROM or RAM.

A RAM is used in two different modes. In particular, a RAM is either used to store a control program therein or used only as a working area without being located with a control program. The former mode requires an operation of writing a control program into the RAM (called a loading operation). It is necessary to execute the loading operation when an NC apparatus is set up, or, in a system wherein a RAM is not backed up by a battery or the like, when the power is made available, or even in a system wherein a RAM is backed up by a battery, when the battery is flat, or else when an old control program is replaced by a new control program, or the like.

Figure 5:
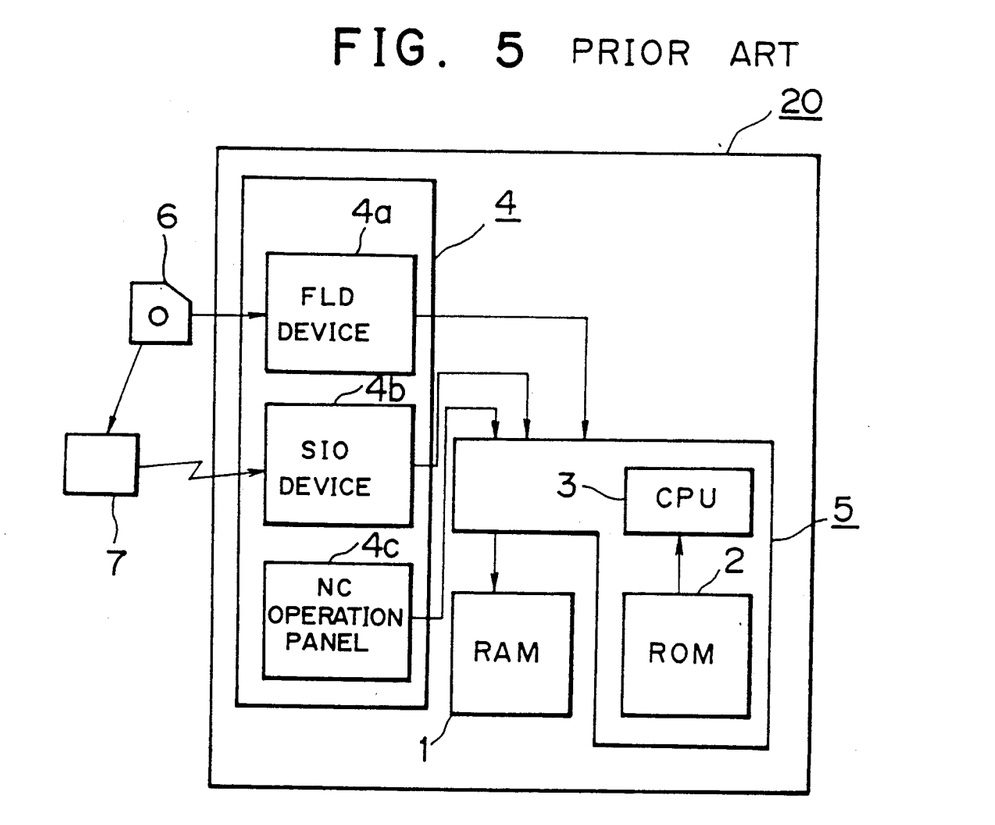
FIG. 5 is a constructional view of a conventional NC apparatus.

FIG. 5 is an exemplary constructional view of a portion concerning the loading operation of a control program within a conventional NC device 20. In the same figure, reference numeral 1 denotes a RAM which is used to store a control program therein and used also as a working area, 2 a ROM in which a program for executing the loading operation and so forth is stored. 3 a CPU, and 4 an input/output (hereinafter referred to as I/O) device which includes a floppy disk (hereinafter referred to as FLD) device 4a and SIO (serial input/output) device 4b. BY the way, reference 5 denotes a control program loading means constituted from the CPU 3 and the ROM 2.

Further, reference numeral 6 denotes an FLD in which a load module of a control program is written, and 7 denotes an FLD serial data converting device for converting data stored in the FLD into serial data.

Figures 6A, 6B:
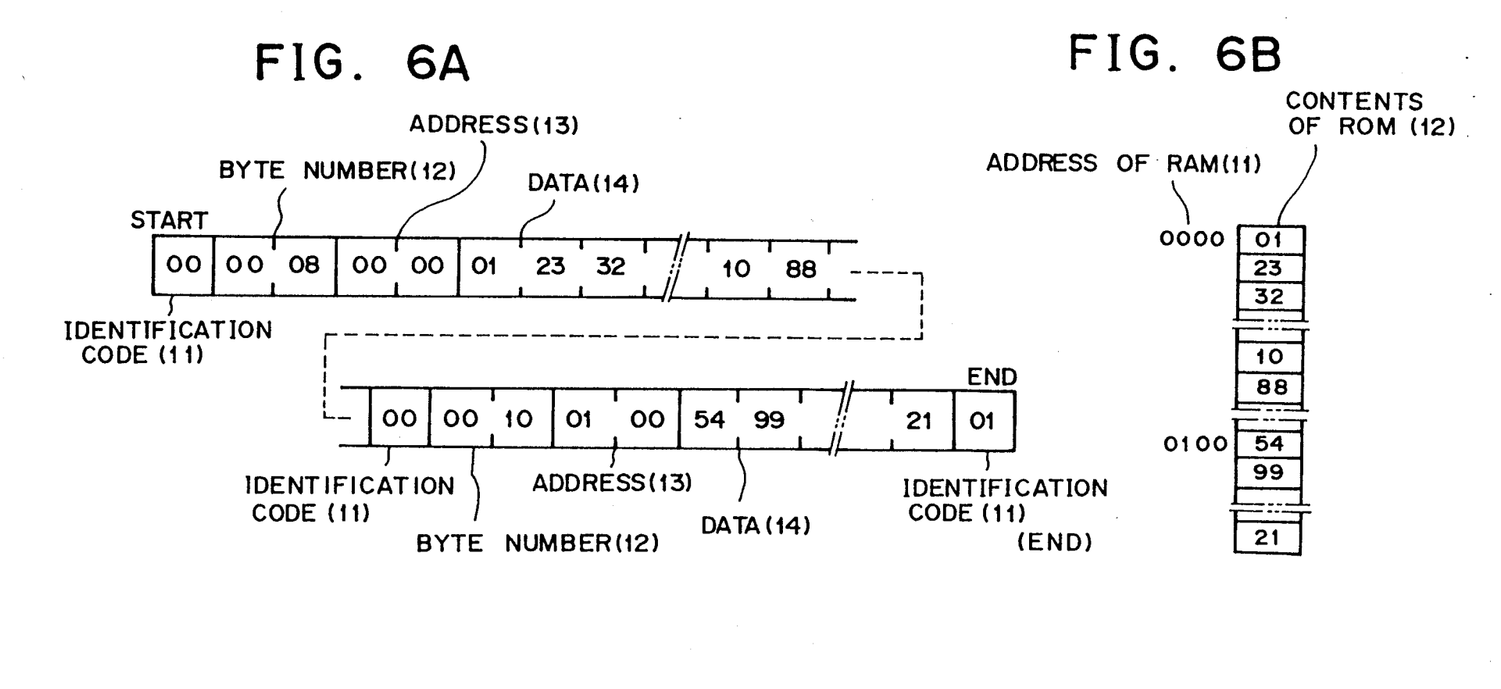
FIGS. 6A and 6B are explanatory views of for explaining a format of a load module.

Subsequently, an example of formation of a load module in a control program is shown in FIGS. 6A and 6B.

As shown in FIG. 6A, a load module is a row of a series of consecutive byte data, which includes therein various data such as an identification code 11 indicating what kind of data follow the same, a byte number 12 indicating how many bytes the following data are composed of, an address 13 indicative of an address at which storage of data is to be started, and data 14 to be actually written into the RAM 1, that is, contents of the control program. Such a row of the identification code 11, byte number 12, address 13 and data 14 is repeated by an arbitrary number of times, and the load module is completed finally with appearance of another identification code 11 indicative of an "end".

Subsequently, operation will be described.

Figure 7:
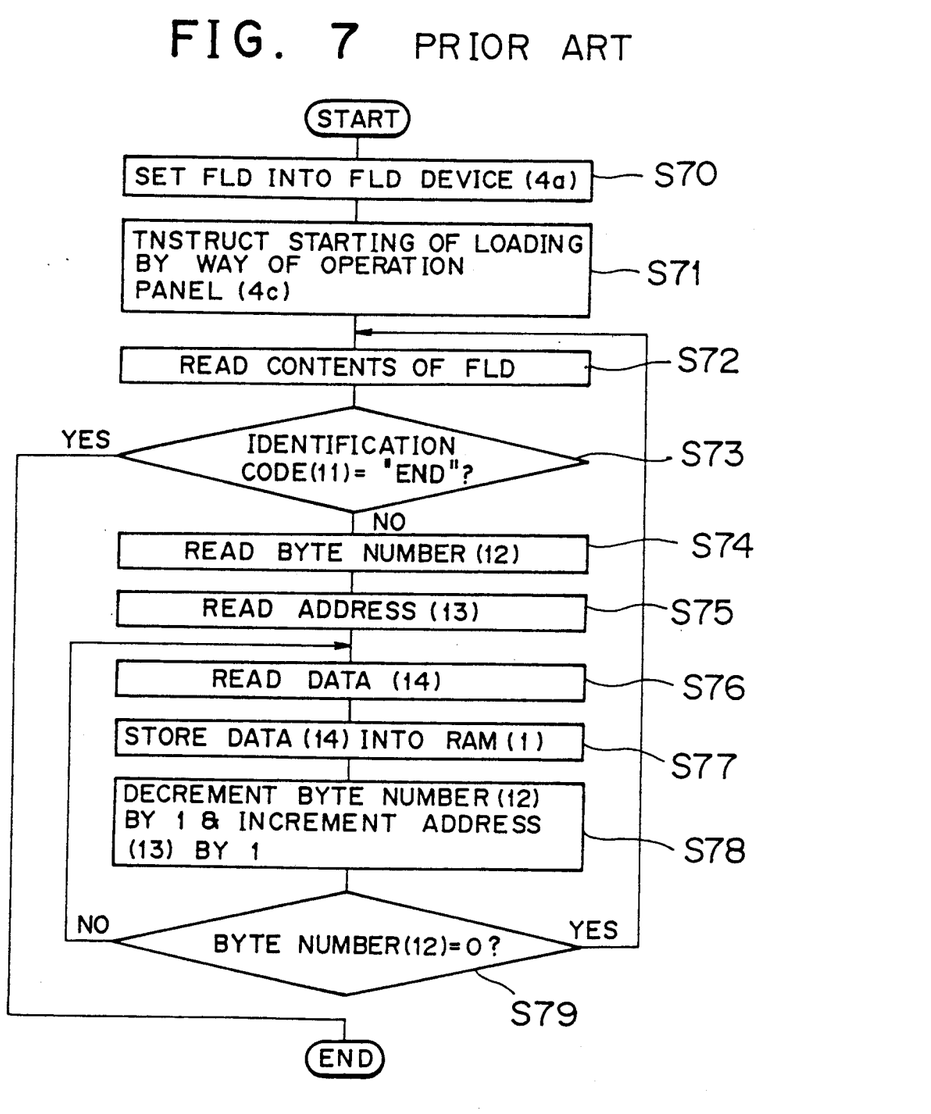
FIG. 7 is a flow chart for explaining operation of the conventional NC apparatus.

At first, operation will be described as an example of the case wherein a load module of a control program written in the FLD 6 is to be loaded from the FLD device 4a built in the NC apparatus 20, with reference to a flow chart in FIG. 7 showing a sequence of the operations to be performed.

First of all, an operator sets the FLD 6 in position into the FLD device 4a (step S70). Then, an instruction to start loading of a control program is entered by operating the NC operation panel 4c (step S72). At first, an identification code 11 is determined (step S73), and in case it indicates the "end", the loading operation is ended. Otherwise, a following byte number 12 is read in (step S74). Subsequently, an address 13 indicative of an address at which storage of data is to be started is read in (step S75). Then, data 14 to be actually stored into the RAM 1 are read in (step S76). In particular, the data 14 themselves are contents of the control program. Then, the data 14 thus read in are stored into an address of the RAM 1 indicated by the address 13 (step S77).

Subsequently, the byte number 12 is decremented by one while the address 13 is incremented by one (step S78). Then, it is determined whether or not storage for a specified number of bytes has been completed, (step S79), and in case such storage has been completed, the sequence returns to step S72 in order to read a following identification code 11. In case the storage has not been completed yet, the sequence returns to step S76 in order to read in data to be stored subsequently.

By the way, the contents of the RAM 1 after such operation has been executed for the load module shown in FIG. 6A are shown in FIG. 6B.

The loading operation is completed with such storage of the control program into predetermined addresses of the RAM 1 as described above, and the functions of the NC apparatus are exhibited as the control program is executed after then.

Nextly, description will be given of the case wherein a program is loaded from the SIO device 4b.

An operator sets the FLD 6, in which a control program is written, in position into the FLD serial data converting device 7 and connects the FLD serial data converting device 7 to the SIO device 4b provided in the NC apparatus by way of a communication line. Then, an instruction to start loading of the control program is entered through the operation of the NC control panel 4c. The loading means 5 reads the above inputted instruction and then reads from the SIO device 4b a load module of the control program transmitted from the FLD serial data converting device 7 and successively stores it into the RAM 1 in accordance with the contents thereof. At a point of time when the load module is read out in the last and completely stored into the RAM 1, the loading operation is ended. The detailed process is omitted herein because there is only a difference whether a portion from which data are read is the FLD device 4a or the SIO device 4b.

Since the method of loading a control program in the conventional NC apparatus proceeds in such a manner as described above, an operator must perform the loading operation by setting into a predetermined device such a record medium in which a load module of a control program is written as the FLD 6, and even when revision or modification of the control program is carried out on the fabricant side or when it becomes necessary to change a control program peculiar to a user, a record medium in which a control program for which revision or modification has been made is written must be forwarded by mail or the like. Further, there are such problems that a copy must be produced in preparation for possible damage to the storage medium.

SUMMARY OF THE INVENTION

The present invention has been made to eliminate such problems as described above, and it is an object of the present invention to provide a method of loading a control program for a numerical control apparatus whereby loading operation of only a load module or modules among load modules of a control program which have undergone some change can be performed by way of a public network.

In order to complete the above object, a load module of the control program for the numerical control apparatus is constituted from a plurality of load modules each including a load module judgment code at the head thereof, and the numerical control apparatus comprises a load module judgment code comparing means for comparing the judgment code of a received load module of the above construction with the judgment code of a corresponding load module loaded in advance in a random access memory device within the numerical control apparatus, a changed load module requesting means for requesting, when the comparison by the load module judgment code comparing means reveals difference between the judgment codes, transmission of the substance of the load module, and a loading means for loading the substance of the load module of the control program received by way of the comparing means and the requesting means into the random access memory device within the numerical control apparatus, whereby loading operation is executed only of a load module or modules among the load modules of the control program which has undergone some change.

With the method of loading a control program for an NC apparatus according to the present invention, since the loading means is provided which stores into the random access memory device within the numerical control apparatus the substance of a load module of a control program received by way of the comparing means and the requesting means, only a load module or modules among a plurality of load modules of a control program which have been changed are loaded. Accordingly, the loading time is reduced significantly compared with the case wherein all of the load modules are loaded. Meanwhile, an operator of the NC apparatus need not prepare, upon such loading operation described above, a storage medium such as an FLD in which the load modules of the control program are written, and the loading operation can be completed only by operation of an operation panel of the NC apparatus. Further, the loading operation can be started, executed and completed by way of a public network.

The above and other objects, features and advantages of the invention will become apparent from the following description and the appended claims, taken in conjunction with the accompanying drawings which show a preferred embodiment of the invention by way of example.

DESCRIPTION OF THE PREFERRED EMBODIMENTS

Figure 1:
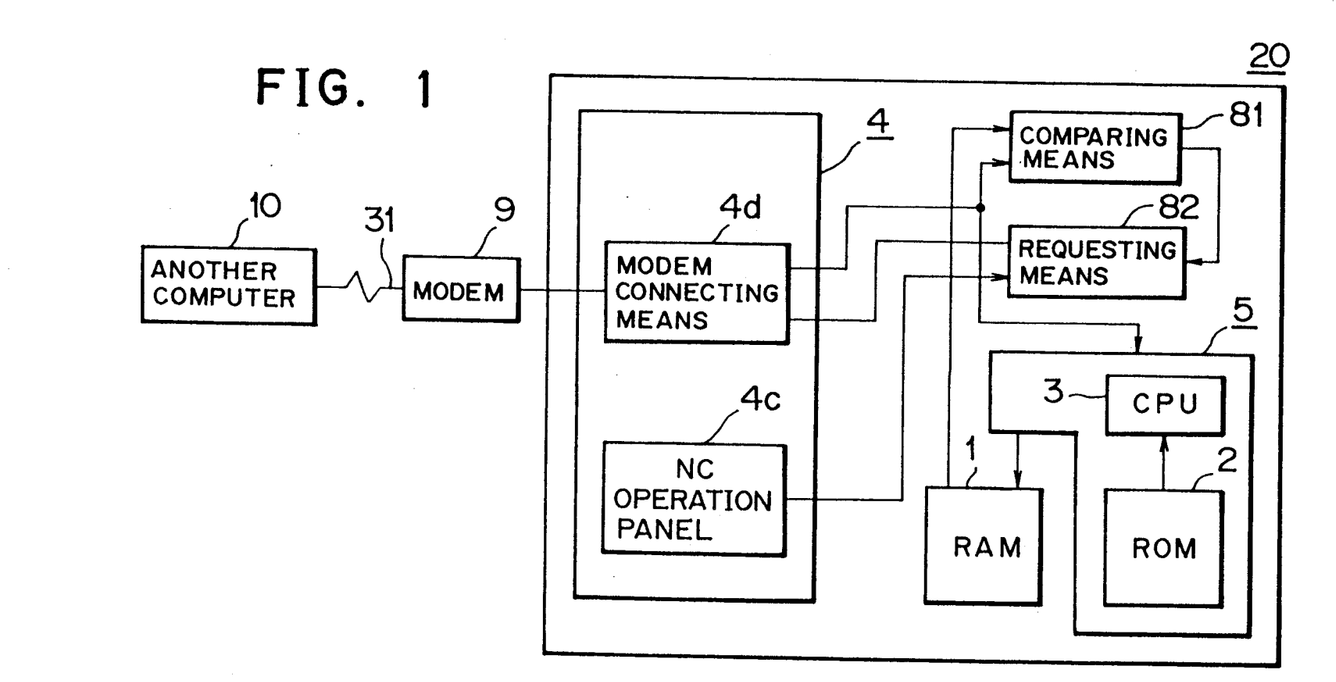
FIG. 1 is a constructional view showing an embodiment of an NC apparatus according to the present invention.

In the following, an embodiment of the present invention will be described with reference to the drawings. Referring to FIG. 1, reference character 1 denotes a RAM which is used for storage of a control program therein and also used as a working area, 2 a ROM in which a program for executing the loading operation of a load module of a control program into the RAM 1 is written, 3 a CPU, 31 a public network, 9 a MODEM to be connected to the public network 31, 4d a MODEM connecting means for connection to the MODEM 9, 5 a known control program loading means constituted from the CPU 3 and the RAM 2, 81 a load module judgment code comparing means for receiving a judgment code of a load module by way of the MODEM connecting means 4d and comparing the received judgment code with a judgment code of a corresponding load module stored in the RAM 1, 82 a changed load module requesting means which operates to request or not request transmission of a substance of a load module by way of the MODEM connecting means 4d in response to a result of comparison of the load module judgment code comparing means, and 10 another computer connected to the MODEM 9 by way of the public network. Here, for example, the public network 31 is a telephone line; the MODEM 9 is an input/output converting device between an RS232C and the telephone line; and the MODEM connecting means 4d is an RS232C input/output device.

Figure 2:
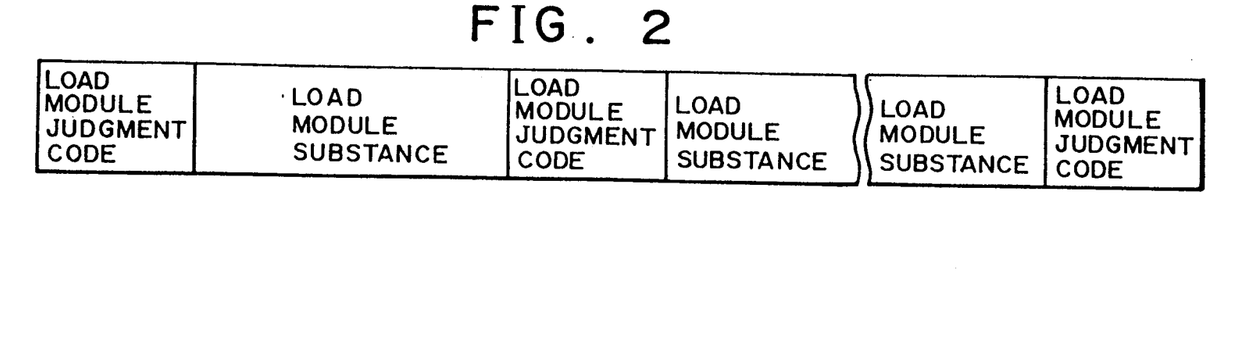
FIG. 2 is an explanatory view showing a construction of a load module of a control program.

Subsequently, operation of the embodiment of the present invention will be described. At first, FIG. 2 is a view for explaining construction of a load module in a loading method according to the present invention. The entire load module is constituted from a plurality of load modules, and as shown in the figure, a load module judgment code is present at the top, and a load module substance described hereinabove with reference to FIG. 6 follows the load module judgment code, whereafter another load module judgment code and another load module substance are repeated successively. Finally, the load modules are ended with a load module judgment code indicative of a meaning of an end.

Here, a load module judgment code is a code for discrimination of a load module and is a code consisting of a version number indicative of what number in an order the load module is, so that it can be checked whether a load module to be transmitted is the same as a load module stored already in the RAM.

Figure 3:
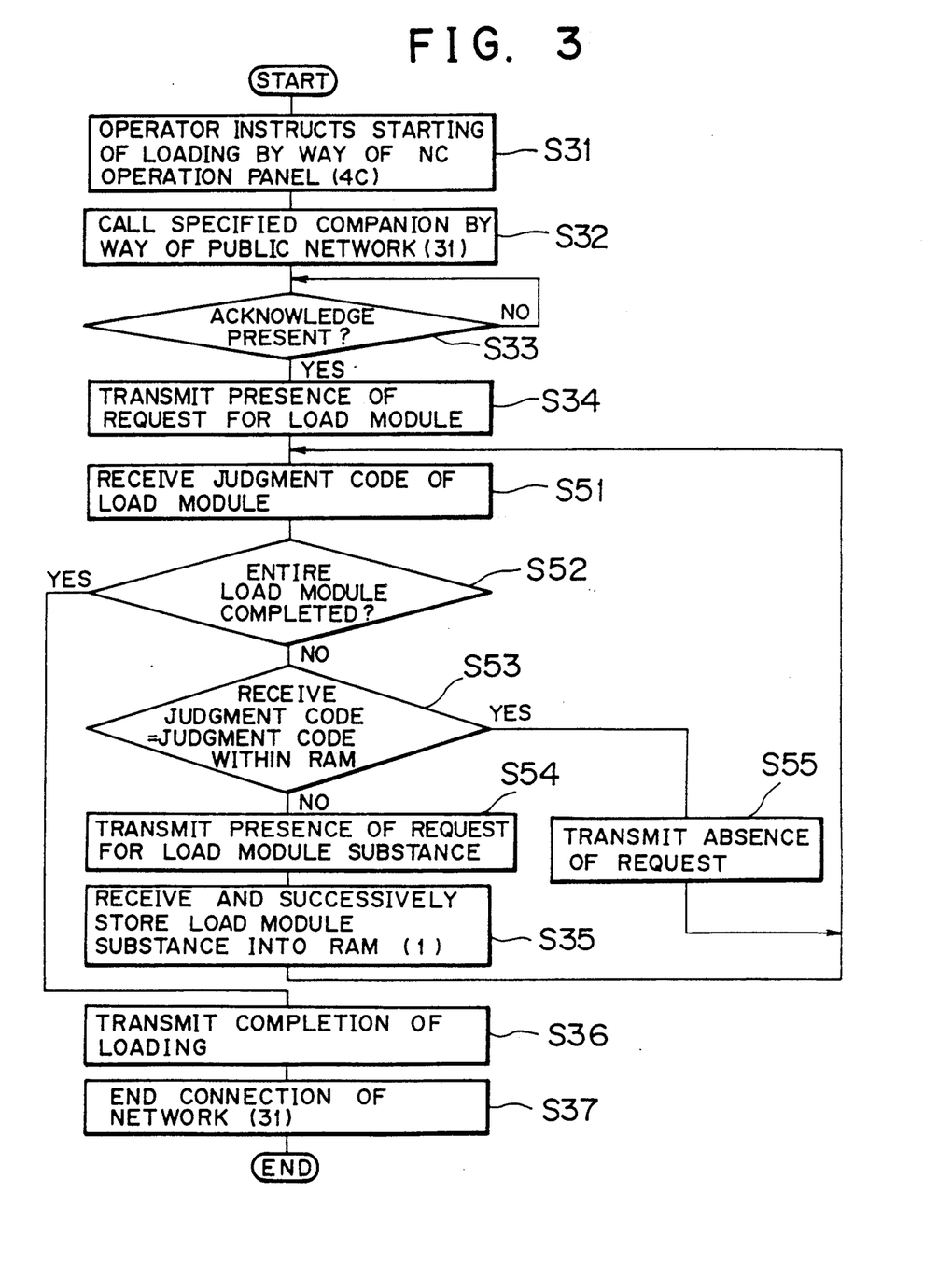
FIGS. 3 and 4 are flow charts for explaining operation of the NC apparatus of the present invention.

At first, an example wherein an instruction to start a loading operation of a load module of a control program is entered by way of the NC operation panel will be described with reference to FIG. 3. At first, an operator enters, by way of the NC operation panel 4c, an instruction to start loading of a control program (step S31). The inputted instruction is transmitted to and interpreted by the changed load module requesting means 82, and from the same means, an instruction such as a particular telephone number to call the computer 10 of another particular party which can transmit a load module of a control program is outputted to the MODEM connecting means 4d. Consequently, the computer 10 of the particular party is called by way of the MODEM 9 (step S32), and an acknowledge is waited for until the call is confirmed (step S33). Subsequently, in order to indicate what is requested, the changed load module requesting means 82 transmits to the computer 10 a fact that there is a request for a load module (step S34). Then, the computer 10 transmits a load module judgment code. The load module judgment code indicates either a version number of a load module or that a load module has been all transmitted.

The load module judgment code comparing means 81 checks whether the received judgment code indicates that transmission of the entire load module has been completed (steps S51 and S52), and in case the judgment code indicates such completion, then the sequence advances to step S36. In case the judgment code indicates otherwise that the transmission has not yet been completed, it is compared with a corresponding judgment code within the RAM 1 (step S53). This corresponds to checking, for example, where the entire load module includes up to 5 load modules, whether the nth (1st to 5th) load module within the entire received load module is the same as the nth load module already present in the RAM 1. If the load modules are constituted such that a load module having a different judgment code has a different value, then it can be determined whether or not there is the necessity of loading a corresponding load module. In case the judgment codes coincide with other at step S53, no loading is required, and consequently, the sequence advances to step S55 at which it is transmitted that no transmission of the substance of the load module is required. In case the judgment codes do not coincide with each other at step S53, loading is required, and consequently, the sequence advances to step S54 at which transmission of the substance of the load module is requested. Subsequently, detailed operation of the step S35 at which the load module substance is received and the control program is sequentially loaded into the RAM 1 (step 35) is illustrated in FIG. 4.

Figure 4:
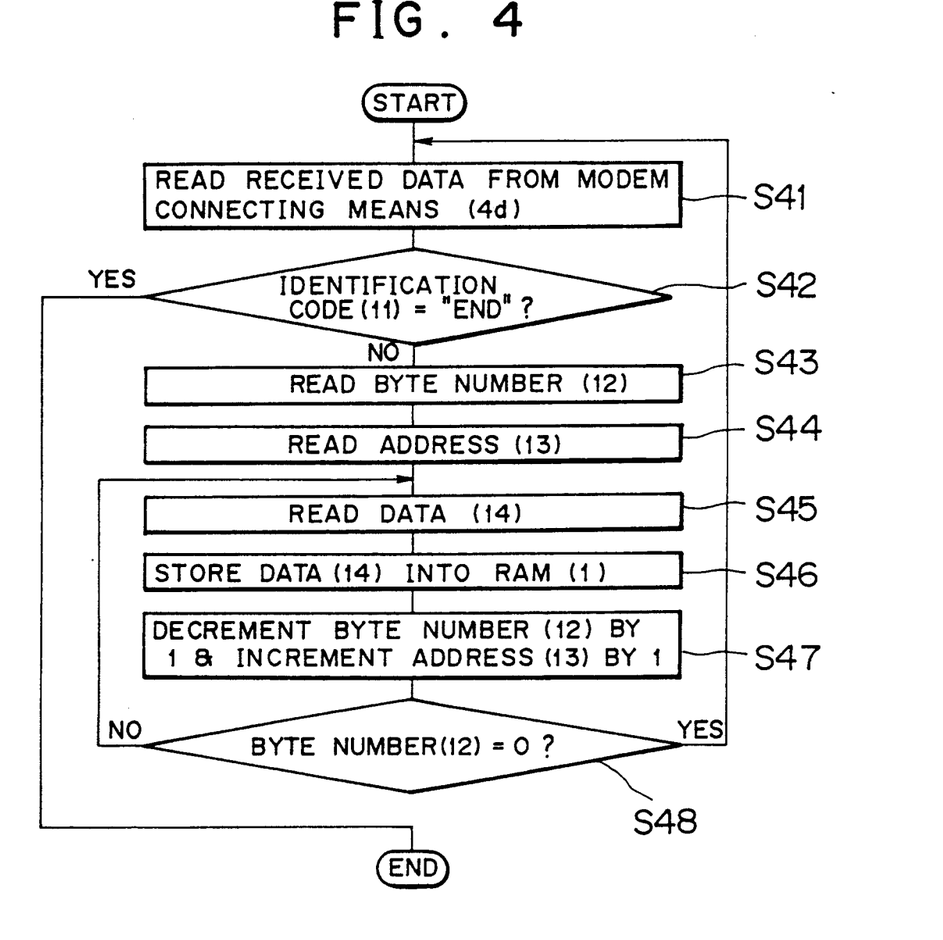

In particular, referring to FIG. 4, at first the changed load module requesting means 82 reads data of a load module of the control program transmitted thereto from the computer 10 by way of the MODEM connecting means 4d and the MODEM 9 (step S41): At first an identification code 11 is determined (step S42), and in case it indicates the "end", this means that the loading operation has been ended, and consequently, the sequence advances to step S36 of FIG. 3. In case the identification code 11 does not indicate the "end", a next byte number 12 is read in (step S43). Subsequently, an address 13 indicative of an address with which storage of data is to be started is read in (step S44). Then, data to be stored into the RAM 1 are actually read in (step S45). In particular, the data 14 themselves are contents of the control program. Subsequently, the data 14 thus read in are stored into the address of the RAM 1 indicated by the address 13 (step S46). Then, the byte number 12 is decremented by one while the address 13 is incremented by one (step S47). Then, it is determined whether or not storage for the specified byte number has been completed (step S48), and in case the storage has been completed, the sequence returns to step S41 in order to read a next identification code 11. In case the storage has not yet been completed, the sequence returns to step S45 in order to read data to be stored subsequently.

Description will be continued referring back to FIG. 3. The operation of storing the one control program into the RAM 1 is completed with the step S35, and the changed load module requesting means 82 receives a next load module judgment code (step S51). In case the entire load modules have not been completed (step S52), the sequence advances to step S53 in order to execute a similar operation to that described hereinabove. If the entire load modules have been completed on the contrary, then the sequence advances to step S36 at which the fact that loading of the entire module has been completed (step S36) is transmitted to the computer 10, whereafter the connection of the public network 31 is ended (step S37).

Description has been given so far of the example wherein a command for starting a loading operation of a load module in a control program is entered by an operator by way of the NC operation panel 4c.

Meanwhile, when an instruction to start a loading operation is provided from the side of the computer 10 connected to the public network 31, if a predetermined command is provided to a remote loading means from the computer 10 by way of the MODEM connecting means 4d, similar operation can be attained to the case wherein an instruction is provided from the NC operation panel.

It is to be noted that, while the example wherein a control program is stored into the RAM 1 is mentioned in the embodiment described above, a control program may otherwise be written into the disk device built in the NC apparatus. Further, while the side from which a control program is transmitted is the computer in the embodiment described above, it may otherwise be an NC apparatus having equivalent functions.

As described so far, according to the present invention, since it is made possible to achieve loading of a control program for an NC apparatus from another computer by way of a public network, even if revision and/or modification of the control program is carried out on the fabricant side, the revised or modified control program can be loaded immediately into the NC apparatus, and variation of a control program peculiar to a user can be carried out readily. Besides, since only a load module or modules among divided load modules which have undergone some change are transferred, only a short loading time is required.

What is claimed is:

1. A method of loading a control program for a numerical control apparatus, comprising the steps of:
   composing said program as a plurality of load modules, wherein each module includes a first judgment code at a head portion thereof, and at least a substantive portion thereafter,
receiving a second judgment code from an external apparatus,
comparing said first judgment code with said second judgment code by a judgment code comparing means,
requesting transmission of said load module associated with said second judgment code by a load module requesting means, when said comparing means reveals a difference between said first and second judgment codes,
transmitting said load module associated with said second judgment code when requested by said load module requesting means,
receiving through said comparing means and requesting means a portion of the load module associated with said second judgment code, and
loading into memory, by loading means, said received portion, wherein said portion only needs to include the substantive portion of said load module.

2. A method of loading a control program for a numerical control apparatus as claimed in claim 1, further comprising the steps of:
including contents within the load module indicating an identification code, a byte number representing the length of the substantive portion of said load module, an address at which a data storing operation is started, and data representing the substantive portion of said load module to be stored,
decrementing said byte number by one, and
incrementing said address by one each time a storing operation of the data proceeds.

3. A method of loading a control program for a numerical control apparatus as claimed in claim 2, further comprising the step of:
changing said first judgment code to equal said second judgment code when said substantive portion of said load module associated with said first judgment code is modified.

4. A method of loading a control program for a numerical control apparatus as claimed in claim 1, further comprising the steps of:
starting reception of said second judgment code sent from an external apparatus, by way of an operation panel by calling a computer of a particular companion party which is capable of transmitting a load module of the control program by way of the MODEM and a public network, and
transmitting, when a response is received, to said computer a representation that there is a request for transmission of said load module.

5. A method of loading a control program for a numerical control apparatus as claimed in claim 4, further comprising the step of:
including within said computer an equivalent function to said numerical control apparatus.

6. A method of loading a control program for a numerical control apparatus as claimed in claim 3, further comprising the step of:
including instructions for the loading operation to said loading means from said external particular companion party.

7. A method of loading a control program for a numerical control apparatus as claimed in claim 3, further comprising the step of:
using RAM as said read/write enabling memory.

8. A method of loading a control program for a numerical control apparatus as claimed in claim 3, further comprising the steps of:
using a disk device as said read/write enabling memory.

* * * * *